United States Patent
Pearson et al.

(10) Patent No.: US 11,371,434 B2
(45) Date of Patent: Jun. 28, 2022

(54) COMPRESSOR PARTICLE SEPARATOR FOR GAS TURBINE ENGINE

(71) Applicant: HONEYWELL INTERNATIONAL INC., Morris Plains, NJ (US)

(72) Inventors: John Pearson, Phoenix, AZ (US); Daniel Aukland, Phoenix, AZ (US); Yogendra Sheoran, Scottsdale, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 96 days.

(21) Appl. No.: 16/997,459

(22) Filed: Aug. 19, 2020

(65) Prior Publication Data
US 2022/0056844 A1    Feb. 24, 2022

(51) Int. Cl.
F02C 7/05 (2006.01)
B01D 45/16 (2006.01)
F02C 7/052 (2006.01)

(52) U.S. Cl.
CPC ............... F02C 7/05 (2013.01); B01D 45/16 (2013.01); F02C 7/052 (2013.01); F05D 2220/32 (2013.01); F05D 2260/607 (2013.01)

(58) Field of Classification Search
CPC . F02C 7/05; F02C 7/052; B01D 45/16; F05D 2220/32; F05D 2260/607
See application file for complete search history.

(56) References Cited

U.S. PATENT DOCUMENTS

| 2,709,893 | A | * | 6/1955 | Birmann | F02C 3/05 417/406 |
| 3,371,471 | A | * | 3/1968 | Connors | F02C 7/052 55/306 |
| 4,382,359 | A | * | 5/1983 | Sampayo | F28D 7/06 60/39.511 |
| 7,581,397 | B2 | | 9/2009 | Strangman et al. | |
| 8,092,145 | B2 | | 1/2012 | Martel et al. | |
| 8,864,444 | B2 | | 10/2014 | Antunes et al. | |
| 9,027,202 | B2 | * | 5/2015 | Huang | B01D 45/12 15/300.1 |
| 10,202,903 | B2 | | 2/2019 | Ahmadian et al. | |
| 10,208,628 | B2 | | 2/2019 | Nasir et al. | |
| 2018/0135516 | A1 | | 5/2018 | Nasir et al. | |
| 2020/0032818 | A1 | | 1/2020 | Nasir et al. | |

FOREIGN PATENT DOCUMENTS

| EP | 3225818 A1 | 10/2017 |
| EP | 3324019 A1 | 5/2018 |
| EP | 3599344 A1 | 1/2020 |

* cited by examiner

Primary Examiner — Steven M Sutherland
(74) Attorney, Agent, or Firm — Lorenz & Kopf, LLP

(57) ABSTRACT

A particle separator associated with a compressor section of a gas turbine engine includes a duct that defines a fluid flow path from a diffuser to a deswirl section. The duct includes a curved portion between an outlet of the diffuser and an inlet of the deswirl section. The curved portion is configured to have at least one low velocity region and a high velocity region. The particle separator includes at least one cluster of inlet passages defined at the at least one low velocity region. The particle separator includes a scavenge plenum coupled to the duct and in fluid communication with the at least one cluster of inlet passages. At least one outlet slot is defined through the duct downstream of the at least one cluster of inlet passages in the high velocity region and is in fluid communication with the scavenge plenum.

20 Claims, 11 Drawing Sheets

COMPRESSOR PARTICLE SEPARATOR FOR GAS TURBINE ENGINE

TECHNICAL FIELD

The present disclosure generally relates to gas turbine engines, and more particularly relates to a particle separator associated with a compressor section of a gas turbine engine.

BACKGROUND

Gas turbine engines may be employed to power various devices. For example, a gas turbine engine may be employed to power a mobile platform, such as an aircraft. Generally, gas turbine engines include one or more compressors in a compressor section, which operate to draw air into the gas turbine engine and to raise a pressure of that air. In certain operating environments, such as desert operating environments, as the gas turbine engine operates, the air drawn into the gas turbine engine may include fine sand and dust particles. These ingested fine sand and dust particles may pass through portions of the gas turbine engine and may interfere with a performance of certain components of the gas turbine engine. For example, the fine sand and dust particles may accumulate in cooling circuits associated with a turbine section downstream of the compressors, may accumulate within cooling holes associated with a combustor downstream of the compressors, etc. This accumulation of the fine sand and dust particles within the downstream components of the gas turbine engine may impede cooling of the affected downstream component, which in turn, may reduce an operating life of the particular downstream component.

Accordingly, it is desirable to provide a compressor particle separator, which substantially removes the fine sand and dust particles contained in the air drawn in by the compressors, thereby reducing an accumulation of fine sand and dust particles downstream of the compressors in the combustor, for example. Furthermore, other desirable features and characteristics of the present invention will become apparent from the subsequent detailed description and the appended claims, taken in conjunction with the accompanying drawings and the foregoing technical field and background.

SUMMARY

According to various embodiments, provided is a particle separator associated with a compressor section of a gas turbine engine. The particle separator includes a duct that defines a fluid flow path from a diffuser to a deswirl section. The duct includes a curved portion between an outlet of the diffuser and an inlet of the deswirl section. The curved portion is configured to have at least one low velocity region and a high velocity region. The particle separator includes at least one cluster of inlet passages defined through the curved portion of the duct at the at least one low velocity region and configured to receive a fluid that includes a plurality of entrained particles from the outlet of the diffuser. The particle separator includes a scavenge plenum coupled to the duct and in fluid communication with the at least one cluster of inlet passages. The scavenge plenum is configured to receive the fluid that includes the plurality of entrained particles from the at least one cluster of inlet passages and to separate the plurality of entrained particles from the fluid to provide at least one outlet slot with the fluid with a reduced plurality of entrained particles. The particle separator includes the at least one outlet slot defined through the duct downstream of the at least one cluster of inlet passages in the high velocity region and in fluid communication with the scavenge plenum. The at least one outlet slot is configured to receive the fluid with the reduced plurality of entrained particles and is configured to cooperate with the at least one cluster of inlet passages to enable the fluid to flow continuously through the scavenge plenum during operation of the gas turbine engine.

The scavenge plenum has a first section with a first radius, and a second section with a second radius. The second radius is different than the first radius, and the second section is configured to inhibit the plurality of entrained particles from flowing through the at least one outlet slot. The second radius is greater than the first radius. The second section is downstream of the at least one outlet slot. The scavenge plenum includes a first plenum endwall opposite a second plenum endwall and a top plenum wall that connects the first plenum endwall to the second plenum endwall. The at least one outlet slot is defined through the duct upstream from the second plenum endwall. The at least one outlet slot is a continuous slot. The scavenge plenum is coupled to the duct so as to be radially outboard of the curved portion. The at least one cluster of inlet passages includes a first cluster of inlet passages and a second cluster of inlet passages. The first cluster of inlet passages is spaced apart from the second cluster of inlet passages about a circumference the curved portion of the duct. The at least one cluster of inlet passages is defined downstream of an adjacent pair of diffuser blades associated with the diffuser. The curved portion has a first end proximate the diffuser and a second end proximate the deswirl section, and the at least one low velocity region is defined at the first end and the high velocity region defined proximate the second end upstream from the deswirl section.

Further provided is a compressor section of a gas turbine engine. The compressor section includes a diffuser configured to receive a fluid that includes a plurality of entrained particles, and a diffuser outlet. The compressor section includes a duct that defines a fluid flow path from the diffuser to a deswirl section. The duct includes a curved portion between the diffuser outlet of the diffuser and an inlet of the deswirl section. The curved portion is configured to have at least one low velocity region upstream from a high velocity region. The compressor section includes a plurality of clusters of inlet passages defined through the curved portion of the duct at the at least one low velocity region and configured to receive the fluid that includes the plurality of entrained particles. Each of the plurality of clusters of inlet passages is spaced apart from each other about a circumference of the curved portion of the duct. The compressor section includes a scavenge plenum coupled to the duct and in fluid communication with the plurality of clusters of inlet passages. The scavenge plenum is configured to receive the fluid that includes the plurality of entrained particles from the plurality of clusters of inlet passages and to separate the plurality of entrained particles from the fluid to provide at least one outlet slot with the fluid with a reduced plurality of entrained particles. The compressor section includes the at least one outlet slot defined through the duct downstream of the plurality of clusters of inlet passages and in fluid communication with the scavenge plenum. The at least one outlet slot is configured to receive the fluid with the reduced plurality of entrained particles and is configured to cooperate with the plurality of clusters of inlet passages to enable the fluid to flow continuously through the scavenge plenum during operation of the gas turbine engine. The compressor section includes the deswirl section downstream from the at least one outlet slot configured to receive the fluid with the reduced plurality of entrained particles.

The scavenge plenum has a first section with a first radius, and a second section with a second radius. The second radius is different than the first radius, and the second section is configured to inhibit the plurality of entrained particles from flowing through the at least one outlet slot. The second radius is greater than the first radius and the second section is downstream of the at least one outlet slot. The scavenge plenum includes a first plenum endwall opposite a second plenum endwall and a top plenum wall that connects the first plenum endwall to the second plenum endwall, and the at least one outlet slot is defined through the duct upstream from the second plenum endwall. The scavenge plenum is coupled to the duct so as to be radially outboard of the curved portion. The curved portion has a first end proximate the diffuser and a second end proximate the deswirl section, with the at least one low velocity region defined at the first end and the high velocity region defined proximate the second end and upstream from the deswirl section. The at least one outlet slot is a continuous slot.

Also provided is a compressor section of a gas turbine engine. The compressor section includes a diffuser configured to receive a fluid that includes a plurality of entrained particles, and a diffuser outlet. The compressor section includes a duct that defines a fluid flow path from the diffuser to a deswirl section. The duct includes a curved portion between the diffuser outlet of the diffuser and an inlet of the deswirl section, and the curved portion is configured to have at least one low velocity region upstream from a high velocity region. The compressor section includes a plurality of clusters of inlet passages defined through the curved portion of the duct at the at least one low velocity region and configured to receive the fluid that includes the plurality of entrained particles. Each of the plurality of clusters of inlet passages is spaced apart from each other about a circumference of the curved portion of the duct. The compressor section includes a scavenge plenum coupled to the duct and in fluid communication with the plurality of clusters of inlet passages. The scavenge plenum is configured to receive the fluid that includes the plurality of entrained particles from the plurality of clusters of inlet passages and to separate the plurality of entrained particles from the fluid to provide at least one outlet slot with the fluid with a reduced plurality of entrained particles. The scavenge plenum includes a first plenum endwall opposite a second plenum endwall and a top plenum wall that connects the first plenum endwall to the second plenum endwall. The compressor section includes an outlet slot defined through the duct downstream of the plurality of clusters of inlet passages and in fluid communication with the scavenge plenum. The outlet slot is defined through the duct upstream from the second plenum endwall. The outlet slot is configured to receive the fluid with the reduced plurality of entrained particles and is configured to cooperate with the plurality of clusters of inlet passages to enable the fluid to flow continuously through the scavenge plenum during operation of the gas turbine engine. The compressor section includes the deswirl section downstream from the outlet slot configured to receive the fluid with the reduced plurality of entrained particles.

The scavenge plenum has a first section with a first radius, and a second section with a second radius, the second radius different than the first radius, and the second section is configured to inhibit the plurality of entrained particles from flowing through the at least one outlet slot. The second radius is greater than the first radius and the second section is downstream of the at least one outlet slot.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
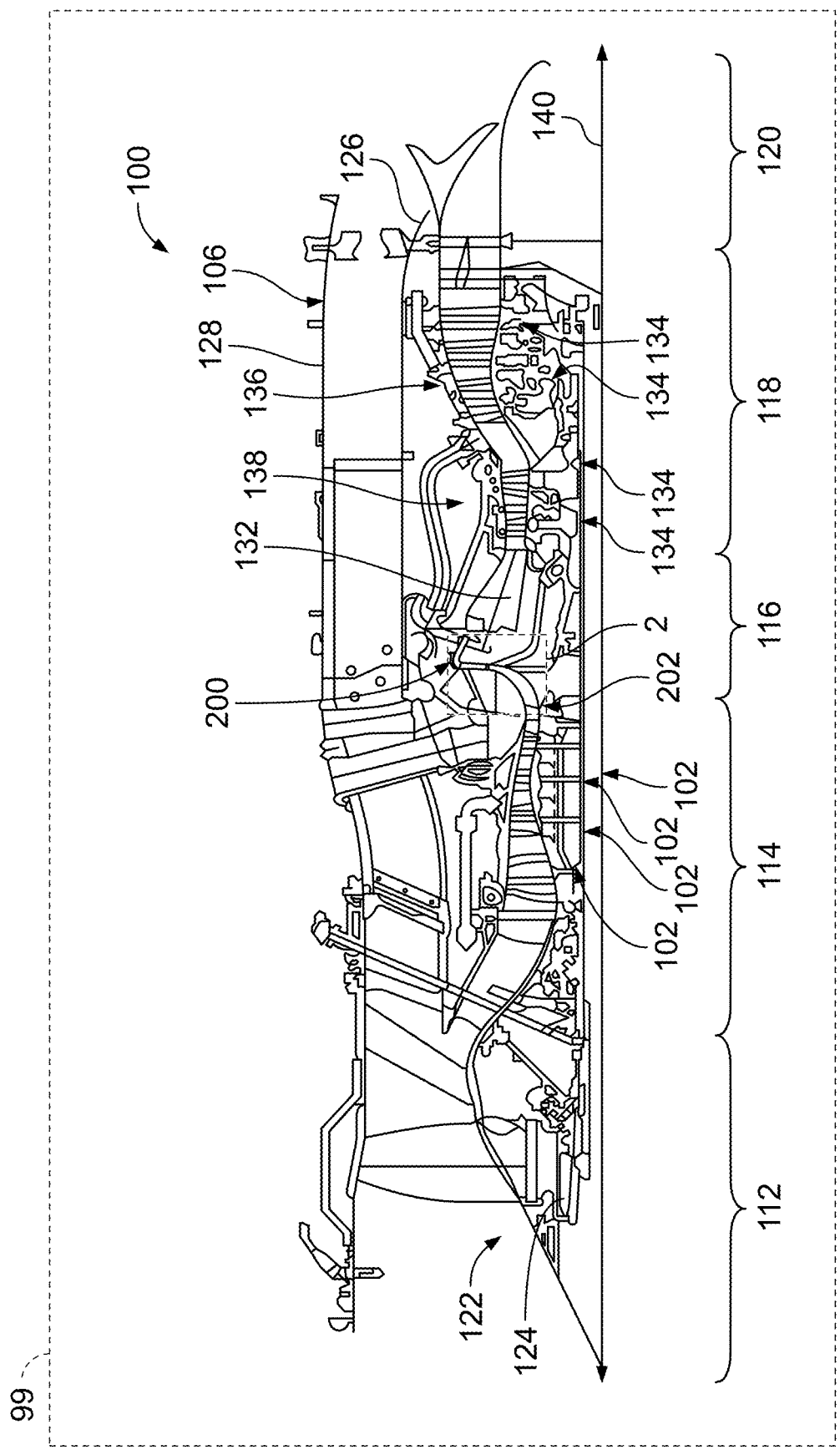
FIG. 1 is a schematic cross-sectional illustration of a gas turbine engine, which includes an exemplary compressor particle separator in accordance with the various teachings of the present disclosure.

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of engine that would benefit from a compressor particle separator and the gas turbine engine described herein is merely one exemplary embodiment according to the present disclosure. In addition, while the compressor particle separator is described herein as being used with a gas turbine engine onboard a mobile platform, such as a bus, motorcycle, train, motor vehicle, marine vessel, aircraft, rotorcraft and the like, the various teachings of the present disclosure can be used with a gas turbine engine on a stationary platform. Moreover, it should be noted that while the particle separator is described herein as being used with a compressor section of a gas turbine engine, the embodiments of the present disclosure may be employed with other sections of a gas turbine engine. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "transverse" denotes an axis that crosses another axis at an angle such that the axis and the other axis are neither substantially perpendicular nor substantially parallel.

With reference to FIG. 1, a partial, cross-sectional view of an exemplary gas turbine engine 100 is shown with the remaining portion of the gas turbine engine 100 being substantially axisymmetric about a longitudinal axis 140, which also comprises an axis of rotation for the gas turbine engine 100. In the depicted embodiment, the gas turbine engine 100 is an annular multi-spool turbofan gas turbine jet engine within an aircraft 99, although other arrangements and uses may be provided. For example, in other embodiments, the gas turbine engine 100 may assume the form of a non-propulsive engine, such as an Auxiliary Power Unit (APU) deployed onboard the aircraft 99, or an industrial power generator. As will be discussed herein, the gas turbine engine 100 includes a compressor particle separator 200, which separates fine sand and dust particles entrained in a fluid, such as air, prior to the fluid flowing downstream to a combustor 132 by enabling a continuous flow of fluid through the compressor particle separator 200 during the operation of the gas turbine engine 100. The continuous flow of fluid in and out of a scavenge plenum 232 associated with the compressor particle separator 200 draws more entrained particles into the scavenge plenum 232, and provides momentum to maintain the flow in the scavenge plenum 232 with a strong tangential velocity that allows the entrained particles to float at a higher radius in the scavenge plenum 232 such that the returning fluid out of the scavenge plenum 232 does not carry the particles out of the scavenge plenum 232. This sequence of particle capture into the scavenge plenum 232 and air exchange in and out of the scavenge plenum 232 may continue as long as the gas turbine engine 100 is in operation, continuing to separate particles from the main engine air flow, which eliminates the need to dump scavenge air overboard. The dumping of scavenge air overboard or purging during operation of the gas turbine engine 100 may reduce an efficiency of the gas turbine engine 100. With the scavenge plenum 232 and the compressor section 114 under high pressure, the separated particles in the scavenge plenum 232 may be purged overboard at engine shutoff by opening a purge or exit valve 201 (FIG. 2A), for example. As will be discussed, the compressor particle separator 200 is about 28% efficient in removing fine sand and dust particles that are about 0.01 micrometers ($\mu$m) to 5 micrometers (m) in size; is about 42% efficient in removing fine sand and dust particles that are about 5 micrometers ($\mu$m) to 10 micrometers ($\mu$m) in size; and is about 33% efficient in removing fine sand and dust particles that are about 10 micrometers ($\mu$m) to 20 micrometers ($\mu$m) in size. By removing these particles of varying sizes, the compressor particle separator 200 reduces a number of the fine sand and dust particles that flow downstream to the combustor 132, etc.

In this example, with continued reference to FIG. 1, the gas turbine engine 100 includes a fan section 112, a compressor section 114, a combustor section 116, a turbine section 118, and an exhaust section 120. In one example, the fan section 112 includes a fan 122 mounted on a rotor 124 that draws air into the gas turbine engine 100 and compresses it. A fraction of the compressed air exhausted from the fan 122 is directed through the outer bypass duct 106 and the remaining fraction of air exhausted from the fan 122 is directed into the compressor section 114. The outer bypass duct 106 is generally defined by an outer casing 128 that is spaced apart from and surrounds the exhaust guide vane 126.

In the embodiment of FIG. 1, the compressor section 114 includes the one or more axial compressors 102, a radial compressor 202 and the compressor particle separator 200. The number of compressors in the compressor section 114 and the configuration thereof may vary. The one or more axial compressors 102 and the radial compressor 202 sequentially raise the pressure of the air and direct the high pressure air to the compressor particle separator 200 (FIG. 2B). Downstream of the compressor particle separator 200, the air flows into a deswirl section 234 (FIG. 2B), and from the deswirl section 234 to the combustor section 116. A fraction of the compressed air bypasses the combustor section 116 and is used to cool, among other components, turbine blades in the turbine section 118.

In the embodiment of FIG. 1, in the combustor section 116, which includes a combustor 132, the high pressure air is mixed with fuel, which is combusted. The high-temperature combustion air or combustive gas flow is directed into the turbine section 118. In this example, the turbine section 118 includes one or more turbines 134 disposed in axial flow series. It will be appreciated that the number of turbines, and/or the configurations thereof, may vary. The combustive gas expands through and rotates the turbines 134. The combustive gas flow then exits turbine section 118 for mixture with the cooler bypass airflow from the outer bypass duct 106 and is ultimately discharged from gas turbine engine 100 through exhaust section 120. As the turbines 134 rotate, each drives equipment in the gas turbine engine 100 via concentrically disposed shafts or spools. Generally, the turbines 134 in the turbine section 118, the axial compressors 102 and the radial compressor 202 in the compressor section 114, and the fan 122 are mechanically linked by one or more shafts or spools. For example, in a two spool turbofan engine platform, the turbine rotors contained within a high pressure (HP) turbine stage 136 may be rotationally fixed to the axial compressors 102 and the radial compressor 202 contained within compressor section 114 by a HP shaft, while the turbines 134 contained within a low pressure (LP) turbine stage 138 may be rotationally fixed to the rotor 124 of the fan 122 by a coaxial LP shaft. In other embodiments, gas turbine engine 100 may be a single spool engine or a multi-spool engine containing more than two coaxial shafts.

Figure 2:
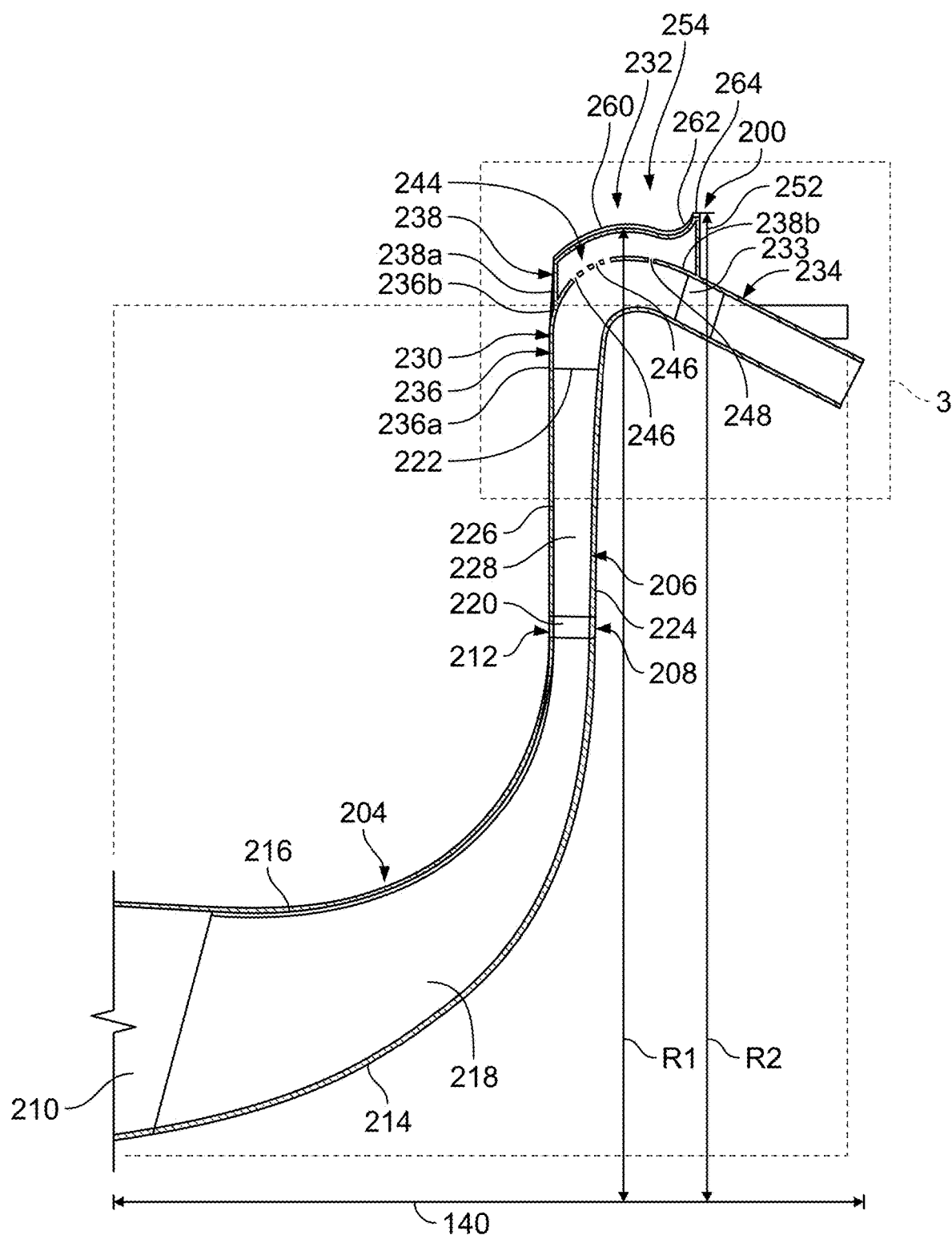
FIG. 2 is a detail cross-sectional view, taken at 2 on FIG. 1, of the compressor particle separator downstream of a radial compressor and upstream from a deswirl section in a direction of a flow of a working fluid through the gas turbine engine in accordance with the various teachings of the present disclosure.

With reference to FIG. 2, a detail cross-sectional view of the radial compressor 202 in fluid communication with the compressor particle separator 200 is shown. In one example, the compressor particle separator 200 is downstream from the radial compressor 202. The radial compressor 202 is downstream from one or more axial compressors 102 (FIG. 1) to receive the compressed air. The radial compressor 202 includes an impeller 204 upstream from a diffuser 206 in a direction of working fluid flow through the gas turbine engine 100 (FIG. 1). The impeller 204 is generally spaced apart from the diffuser 206 by a vaneless gap 208 that is devoid of vanes or airfoils. The impeller 204 has an impeller inlet 210 in fluid communication with the one or more axial compressors 102 (FIG. 1) and an impeller outlet 212 in fluid communication with the diffuser 206. The impeller 204 includes an impeller hub 214, an impeller shroud 216, and a plurality of impeller blades 218. Optionally, the impeller 204 may include a plurality of splitter blades.

The diffuser 206 is downstream from the impeller 204. The diffuser 206 has a diffuser inlet 220 in fluid communication with the impeller outlet 212, and a diffuser outlet 222 downstream from the diffuser inlet 220. As will be discussed, the diffuser outlet 222 is in fluid communication with the compressor particle separator 200. The diffuser 206 includes a hub 224, a shroud 226 and at least one or a plurality of diffuser blades 228. The diffuser 206 converts the kinetic energy imparted by the impeller 204 in the received fluid or air into a static pressure rise. In one example, the hub 224 circumscribes the impeller 204 when the diffuser 206 is installed in the gas turbine engine 100 (FIG. 1). The fluid or air, including a plurality of entrained fine sand and dust particles, flows from the diffuser 206 to the compressor particle separator 200 (FIG. 2B).

In this example, the compressor particle separator 200 includes a duct 230 and a scavenge plenum 232. The duct 230 may be integrally formed with the diffuser 206, and may be composed of metal or metal alloy. The duct 230 and the diffuser 206 may be formed via additive manufacturing, such as direct metal laser sintering (DMLS), etc. The scavenge plenum 232 may be composed of metal or metal alloy, and integrally formed with the duct 230. The scavenge plenum 232 may be integrally formed with the duct 230 via additive manufacturing, such as direct metal laser sintering (DMLS), etc., as discussed. Alternatively, the scavenge plenum 232 may be separately formed and coupled to the duct 230 via any suitable technique, such as one or more mechanical fasteners, welding, etc.

The duct 230 interconnects the compressor particle separator 200 with the diffuser outlet 222 of the diffuser 206, and interconnects the compressor particle separator 200 with an inlet 233 of a deswirl section 234. The duct 230 defines a fluid flow path from the diffuser 206 to the deswirl section 234. The duct 230 is axisymmetric with regard to the longitudinal axis 140 (FIG. 2B). The duct 230 includes a straight or radial portion 236 and a curved portion 238 downstream of the radial portion 236. The radial portion 236 is coupled to or integrally formed with the diffuser outlet 222 of the diffuser 206 at a first end 236a, and is coupled to or integrally formed with the curved portion 238 at a second end 236b. The curved portion 238 is coupled to or integrally formed with the radial portion 236 at a first end 238a and is coupled to the inlet 233 of the deswirl section 234 at a second end 238b. The curved portion 238 defines a turn, generally indicated by reference numeral 239, between the first end 238a and the second end 238b. In this example, the scavenge plenum 232 is integrally formed with the duct 230 such that the duct 230 and the scavenge plenum 232 share a common wall 231, which is defined along a perimeter of the curved portion 238 of the duct 230.

Figure 3:
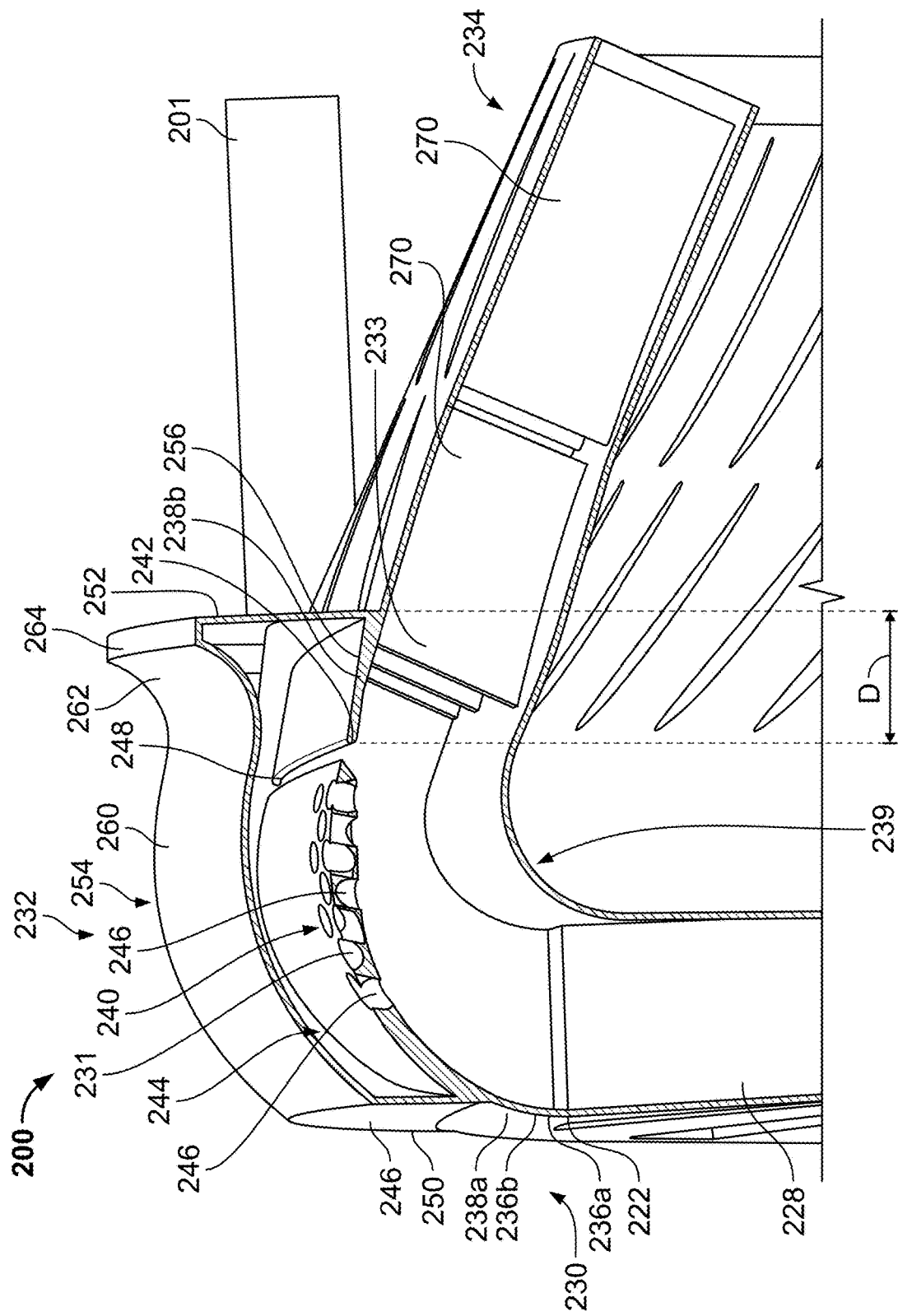
FIG. 3 is a detail cross-sectional view of the compressor particle separator taken from line 3-3 of FIG. 2B.
Figure 3A:
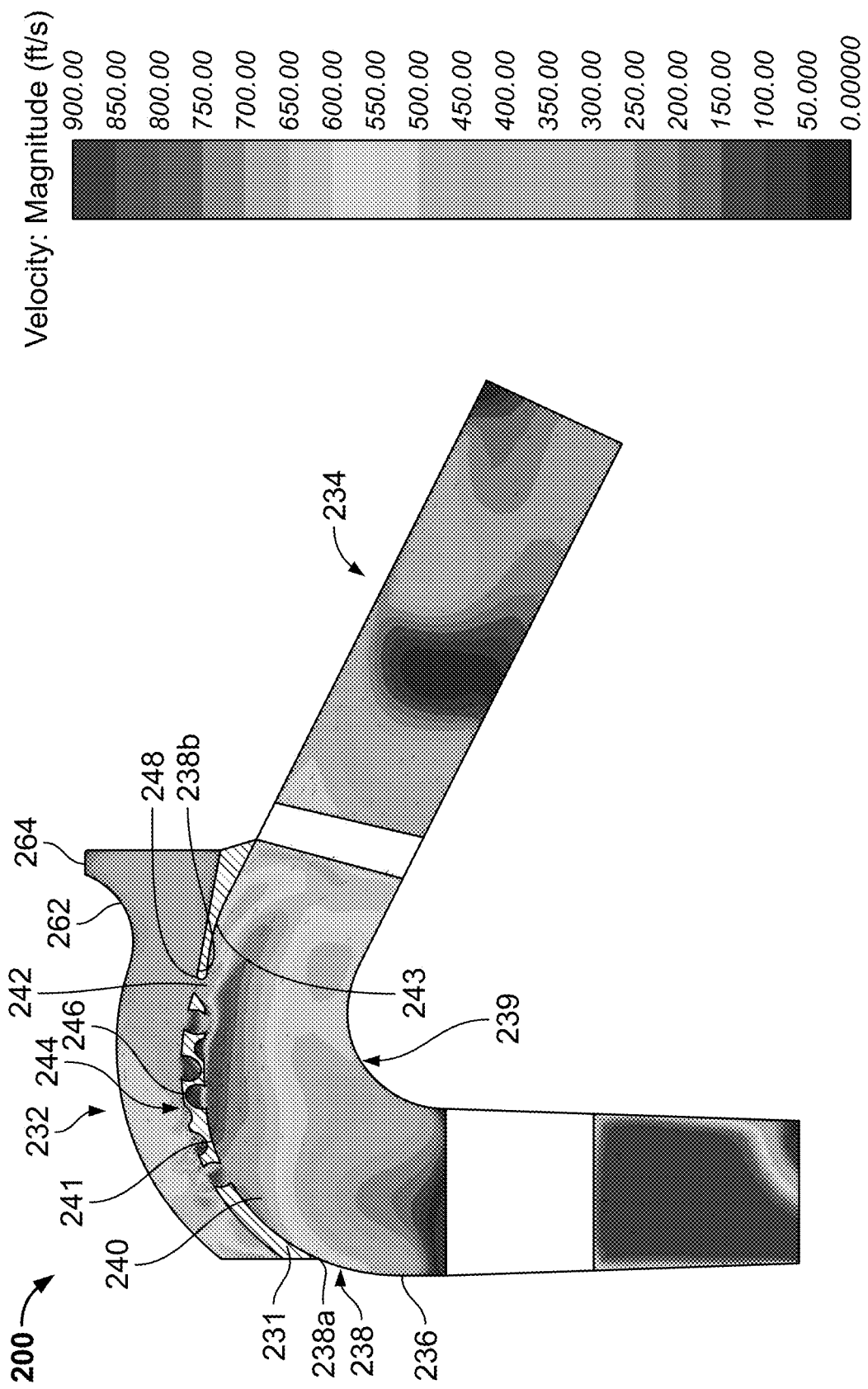
FIG. 3A is a detail cross-sectional schematic view of the compressor particle separator, which illustrates a velocity of a flow of the fluid, such as the air, with a plurality of entrained particles, such as fine sand and dust particles, through the compressor particle separator.
Figure 3B:
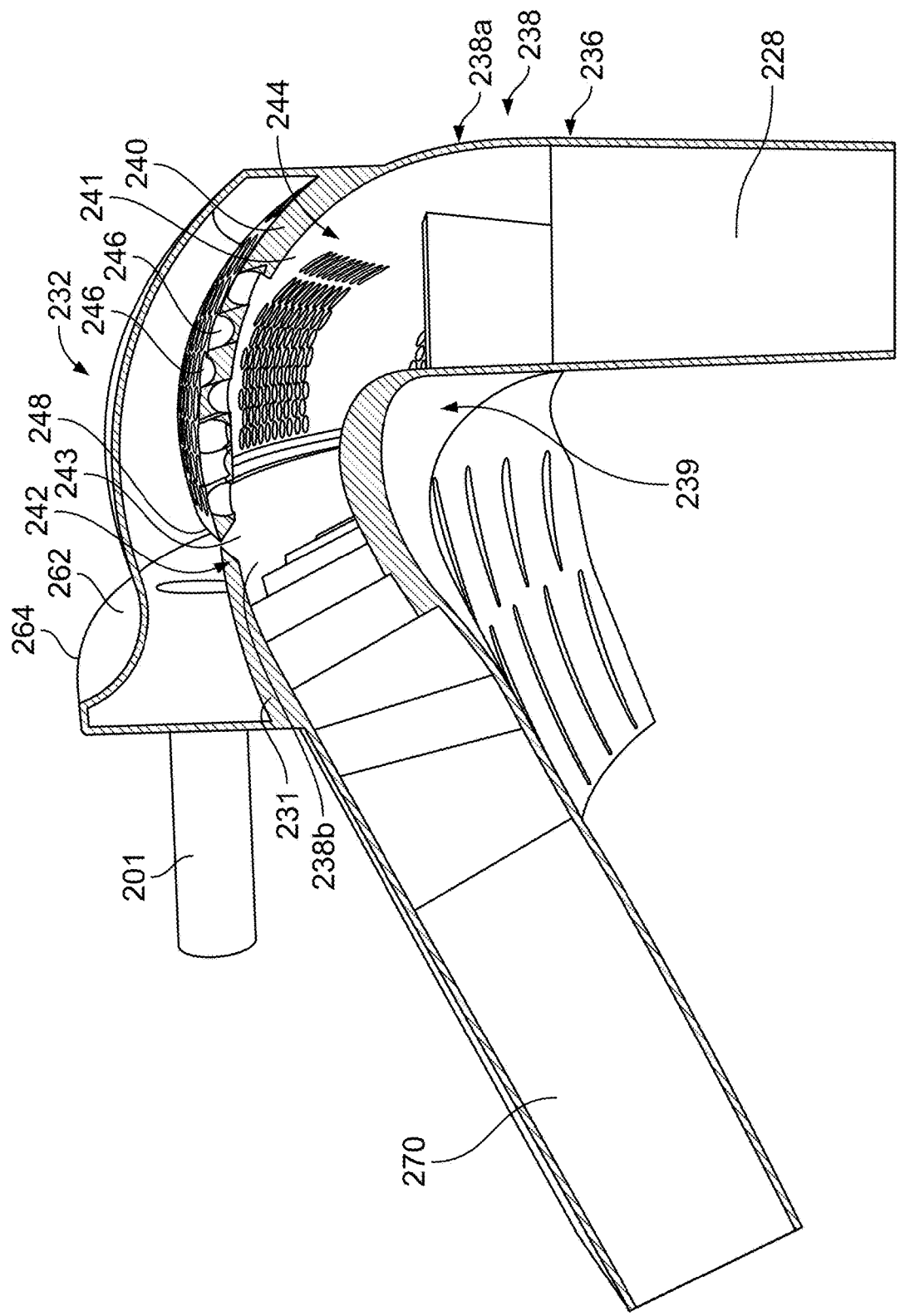
FIG. 3B is a detail cross-sectional view of the compressor particle separator taken from line 3B-3B of FIG. 2B.

With reference to FIGS. 3 and 3B, the compressor particle separator 200 is shown in greater detail. The curved portion 238 has a low velocity region 240 defined at the first end 238a and a high velocity region 242 defined at the second end 238b. The low velocity region 240 receives the fluid or air from the diffuser outlet 222 of the diffuser 206, and the air from the diffuser outlet 222 of the diffuser 206 has a high local pressure and a low velocity. As the fluid or air follows the curved portion 238 of the duct 230 and turns at the turn 239 from the first end 238a to the second end 238b, the velocity increases such that the velocity of the air at the second end 238b is higher than the velocity of the air at the first end 238a, thereby defining the respective low velocity region 240 and high velocity region 242.

Figure 7:
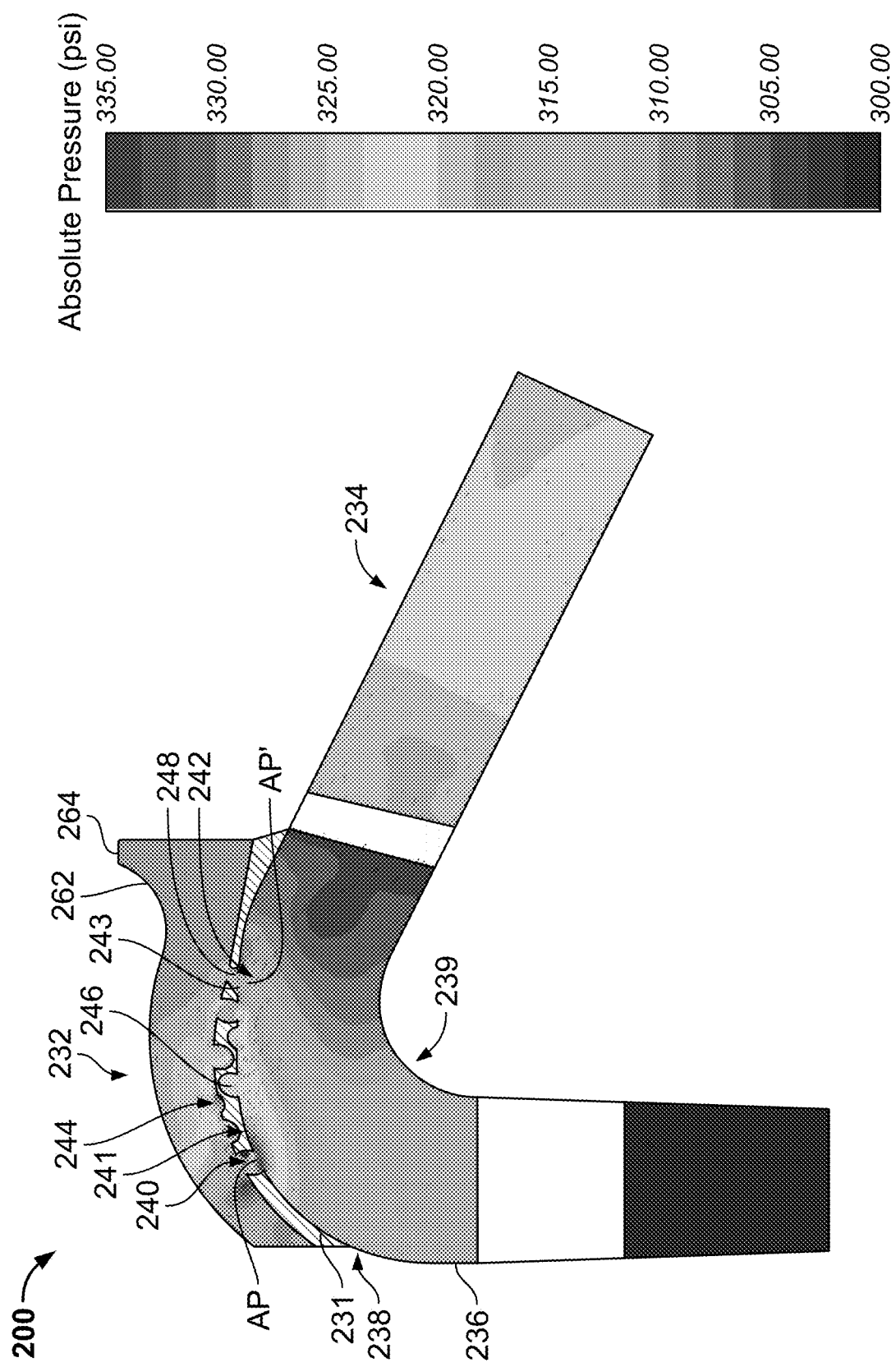
FIG. 7 is a detail cross-sectional schematic view of the compressor particle separator, which illustrates a flow of the fluid, such as the air, with the plurality of entrained particles into the scavenge plenum and a flow of fluid, such as air, with a reduced plurality of entrained particles out of the scavenge plenum.

In this regard, with reference to FIG. 3A, at the entrance of the turn 239 at the first end 238a, the airflow impinges on the curved portion 238 and velocity is lower (low velocity region 240) and local pressure on the curved portion 238 is higher, forming a local high pressure region 241 (FIG. 7). The airflow and entrained particles enter the scavenge plenum 232 through a plurality of clusters 244 of inlet passages 246. At the exit of the turn 239 at the second end 238b, the airflow is parallel to the curved portion 238 (already turned), and the velocity is higher (high velocity region 242) due to grazing or recirculating flow and the local pressure at the second end 238b of the curved portion 238 is lower, forming a local low pressure region 243. By defining the at least one outlet slot 248 at the high velocity region 242 and the local low pressure region 243, fluid is drawn out of the scavenge plenum 232 into the duct 230. Generally, the low velocity region 240 is at the local high pressure region 241 defined at the first end 238a of the curved portion 238 due to the impingement flow, and the high velocity region 242 is at the local low pressure region 243 defined at the second end 238b of the curved portion 238 due to the recirculation or grazing flow. As discussed, the local high pressure region 241 is due to the impingement of the flow on the curved portion 238 at the turn 239, while the local low pressure region 243 is due to grazing or recirculating flow through the curved portion 238 downstream of the turn 239. In one example, the low velocity region 240 has a velocity of about 100 feet per second (ft/s) to about 400 feet per second (ft/s), while the high velocity region 242 has a velocity of about 650 feet per second (ft/2) to about 900 feet per second (ft/s). The local low pressure region 243 has an absolute pressure of 308 pounds per square inch (psi) to about 314 pounds per square inch (psi), while the local high pressure region 241 has an absolute pressure of about 318 pounds per square inch (psi) to about 332 pounds per square inch (psi).

In one example, with reference back to FIG. 3, the plurality of clusters 244 of inlet passages 246 are defined through the duct 230 at the first end 238a of the curved portion 238 and through the scavenge plenum 232, and at least one outlet slot 248 is defined through the duct 230 at the second end 238b and through the scavenge plenum 232. Each of the clusters 244 of inlet passages 246 fluidly couple the duct 230 to the scavenge plenum 232. The clusters 244 of inlet passages 246 are defined in the curved portion 238 of the duct 230 at the low velocity region 240. By defining the clusters 244 of inlet passages 246 at the low velocity region 240, the air flowing from the diffuser 206 impinges on the duct 230, and the air that includes entrained fine sand and dust particles passes through the inlet passages 246 into the scavenge plenum 232. In this regard, due to the particle mass of the entrained fine sand and dust particles and the low velocity and high local pressure of the air at the first end 238a of the curved portion 238, the air with the entrained fine sand and dust particles flows through the clusters 244 of inlet passages 246 into the scavenge plenum 232. Thus, the clusters 244 of inlet passages 246 are defined through the low velocity region 240 at the first end 238a of the curved portion 238 at areas with low velocity and high local pressure to promote the entry of the air with the entrained fine sand and dust particles into the scavenge plenum 232. In one example, the clusters 244 of inlet passages 246 are drilled through the curved portion 238 to fluidly couple the duct 230 to the scavenge plenum 232.

Figure 4:
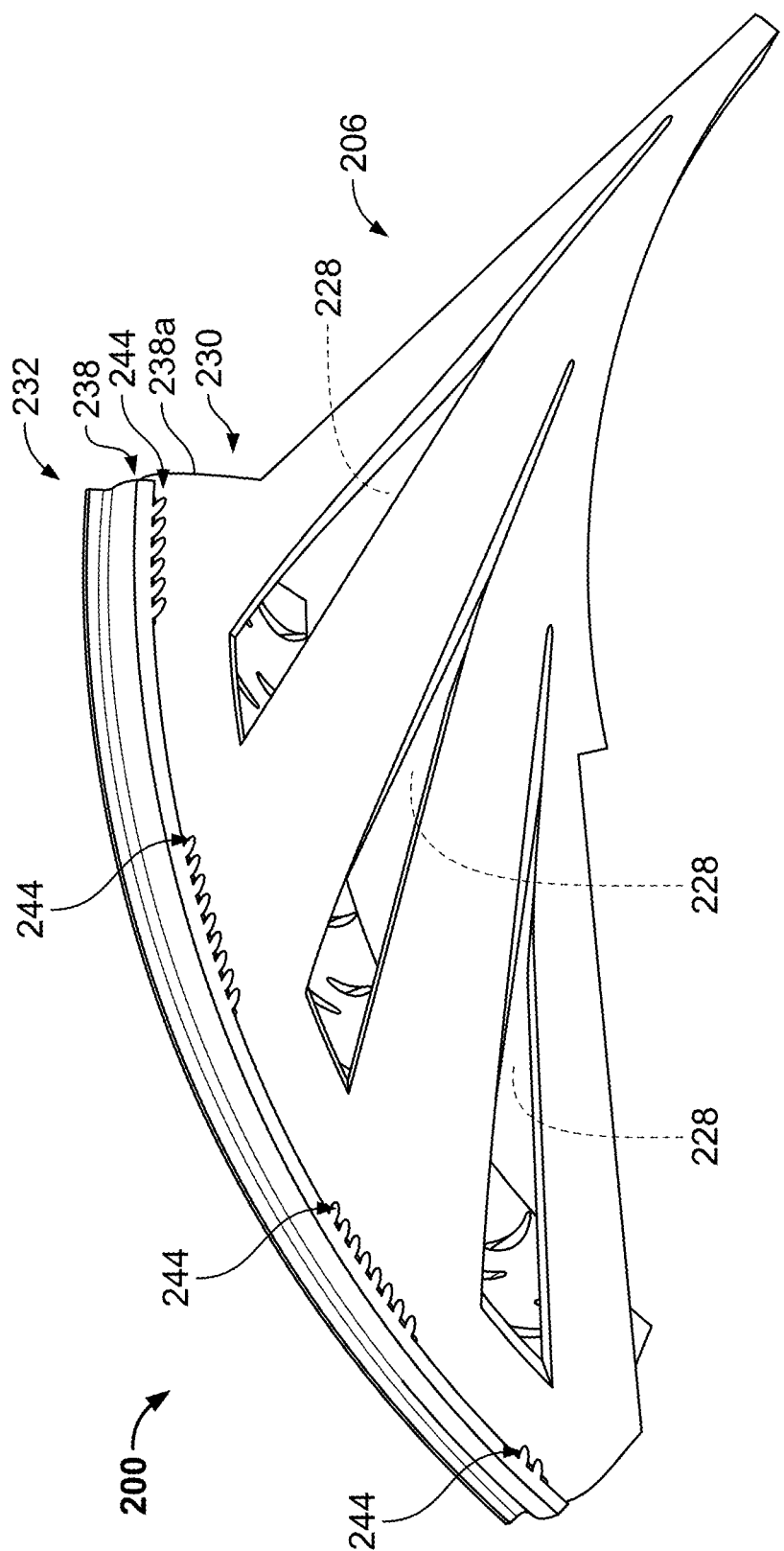
FIG. 4 is a front perspective view of a portion of the compressor particle separator.
Figure 5:
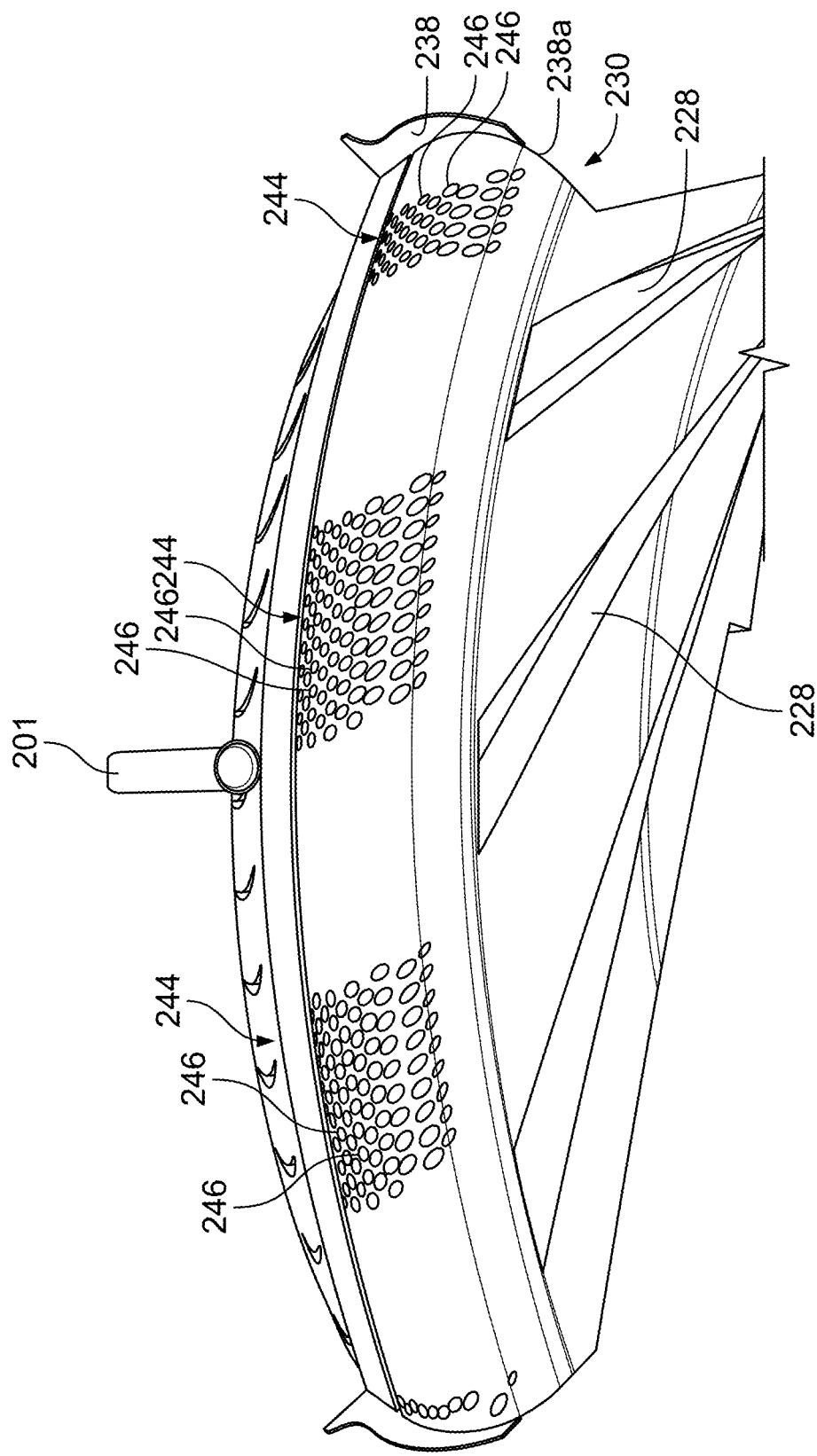
FIG. 5 is a front perspective view of the portion of the compressor particle separator, which illustrates a plurality of clusters of inlet passages defined through a duct of the compressor particle separator, in which a first or top plenum wall of a scavenge plenum associated with the compressor particle separator has been removed for clarity.

With reference to FIG. 4, a portion of the duct 230 is shown with a portion of the scavenge plenum 232, and with reference to FIG. 5, the portion of the duct 230 is shown with a first or top plenum wall 254 of the scavenge plenum 232 removed. As shown, the clusters 244 of inlet passages 246 are spaced apart about a perimeter or circumference of the duct 230. As shown, generally, each cluster 244 is defined downstream of the diffuser blades 228 so as to be positioned downstream of a respective pair of adjacent diffuser blades 228. By positioning each cluster 244 downstream of the respective pair of adjacent diffuser blades 228, the local high pressure, low velocity air flow between the diffuser blades 228 is directed into the respective cluster 244 of the inlet passages 246. Thus, in one example, the duct 230 has a plurality of the low velocity regions 240 and a plurality of local high pressure regions 241 spaced apart about a circumference of the duct 230. The clusters 244 of inlet passages 246 are aligned with areas of the strongest flow of air from the diffuser 206, which preserves swirl. Stated another way, with reference to FIG. 6, recirculation flow along a base 228a of the diffuser blades 228 is a local low pressure region. If clusters 244 were to be placed in this local low pressure region in the curved portion 238, flow in the scavenge plenum 232 would flow back out, bringing particles back out of the scavenge plenum 232 before the particles have a chance to gain higher radius orbit within the scavenge plenum 232. By placing the clusters 244 in a discontinuous matter about the curved portion 238 at the respective low velocity region 240 and the local high pressure region 241, air within the scavenge plenum 232 may be refreshed and tangential velocities within the scavenge plenum 232 may remain high to sustain particle circumferential velocities, but the amount of particles that flow back out of the scavenge plenum 232 is significantly reduced. Each cluster 244 may have any predetermined number of inlet passages 246, and in one example, may include about 60 to about 90 inlet passages 246.

In one example, with reference back to FIG. 3, each of the inlet passages 246 is defined through the first end 238a of the curved portion 238 of the duct 230 and through the scavenge plenum 232 to fluidly couple the duct 230 to the scavenge plenum 232. Generally, each of the inlet passages 246 is defined through the duct 230 so as to be leaned over by about 35 degrees circumferentially and about 15 degrees axially. In other embodiments, each of the inlet passages 246 may be defined through the duct 230 so as to be leaned over by about 30 degrees to 50 degrees circumferentially, and about 10 degrees to 30 degrees axially. The angling of the inlet passages 246 also preserves swirl and prevents recirculation of the air through the inlet passages 246. Generally, the angle of the inlet passages 246 directs the air with the entrained fine sand and dust particles to enter into the scavenge plenum 232 with a tangential velocity. The tangential velocity of the air with the entrained fine sand and dust particles assists in keeping the particles moving in the scavenge plenum 232, which aids in retaining the particles within the scavenge plenum 232, as will be discussed. The inlet passages 246 are generally circular, however, the inlet passages 246 may have any desired shape.

The at least one outlet slot 248 is defined through the scavenge plenum 232 and the duct 230. In this example, the at least one outlet slot 248 comprises a continuous slot, which is defined about the outer perimeter or circumference of the duct 230 through the common wall 231 to fluidly couple the scavenge plenum 232 to the duct 230. The outlet slot 248 is defined downstream of the inlet passages 246a, and is upstream by a distance D from the second plenum endwall 252 (FIG. 3). In one example, the distance D is about 0.25 inches (in.). It should be noted, however, that the outlet slot 248 may have other configurations. As discussed, the outlet slot 248 fluidly couples the scavenge plenum 232 to the duct 230. The outlet slot 248 is defined through the curved portion 238 of the duct 230 in the high velocity region 242 near the second end 238b so as to be spaced apart from a second plenum endwall 252 of the scavenge plenum 232. By defining the outlet slot 248 at the high velocity region 242 proximate the second end 238b, the air circulates continuously through the scavenge plenum 232 during the operation of the gas turbine engine 100. As will be discussed, the air enters the scavenge plenum 232 at the low velocity region 240 at the first end 238a, and flows through the scavenge plenum 232. Due to the shape of the scavenge plenum 232, a portion of the entrained fine sand and dust particles remain within the scavenge plenum 232, and air with a reduced plurality of entrained fine sand and dust particles exits the scavenge plenum 232 through the outlet slot 248 and flows downstream into the deswirl section 234, and from the deswirl section 234, to the combustor 132.

The scavenge plenum 232 is fluidly coupled to the duct 230 at the clusters 244 of the inlet passages 246 and at the outlet slot 248. The scavenge plenum 232 is annular and is coupled to or integrally formed with the duct 230 about the perimeter or circumference of the duct 230. The scavenge plenum 232 is axisymmetric with regard to the longitudinal axis 140 (FIG. 2B). The scavenge plenum 232 is coupled to or integrally formed with the duct 230 so as to be radially outboard of the curved portion 238 (FIG. 2B). The scavenge plenum 232 includes a first plenum endwall 250, the second plenum endwall 252 opposite the first plenum endwall 250, a first or top plenum wall 254 and a second or bottom plenum surface 256 opposite the top plenum wall 254. The first plenum endwall 250 is coupled to the duct 230 at the first end 238a of the curved portion 238 at the low velocity region 240. The first plenum endwall 250 extends radially outward and interconnects the top plenum wall 254 to the bottom plenum surface 256. The second plenum endwall 252 is coupled to the duct 230 at the second end 238b of the curved portion 238 at the high velocity region 242. The second plenum endwall 252 extends radially outward and interconnects the top plenum wall 254 to the bottom plenum surface 256. In one example, with reference to FIG. 2A, the second plenum endwall 252 includes the exit valve 201 coupled to the second plenum endwall 252. The exit valve 201 enables the particles to be removed from the scavenge plenum 232 when the gas turbine engine 100 is shut down. The exit valve 201 may be positioned at any desired location along the scavenge plenum 232, and may be angled, if desired. The exit valve 201 may be coupled to suitable tubing, ducting, hoses, etc. and a source of vacuum, if desired, to assist in removing the particles from the scavenge plenum 232.

The top plenum wall 254 defines an outer perimeter or circumference of the scavenge plenum 232. The top plenum wall 254 includes a first section 260, an intermediate section 262 and a second section 264. The first section 260 is curved with a generally convex curvature, and in one example, has a radius of curvature, which is substantially similar or the same as a radius of curvature of the curved portion 238 such that the first section 260 follows the curvature of the duct 230. The first section 260 follows the curved portion 238 of the duct 230 for an axial distance that is predetermined such that the first section 260 extends over the clusters 244 of the inlet passages 246 and the outlet slot 248. The intermediate section 262 is defined downstream of the outlet slot 248, and the clusters 244. The intermediate section 262 is defined between the first section 260 and the second section 264. The intermediate section 262 is generally concave, and interconnects the first section 260 with the second section 264. Generally, the intermediate section 262 is curved with the concave curvature to transition the scavenge plenum 232 from the first section 260, which has a first radius to the second section 264, which has a second radius. With reference back to FIG. 2, the first section 260 has a first radius R1 relative to the longitudinal axis 140 (axis of rotation of the gas turbine engine 100, FIG. 1), which is different, and less than a second radius R2 of the second section 264 relative to the longitudinal axis 140. The larger second radius R2 defined by the second section 264 maintains a circumferential movement of the fine sand and dust particles within the scavenge plenum 232, and maintains the fine sand and dust particles moving circumferentially away from both the inlet passages 246 and the outlet slot 248. Thus, the second section 264, with the larger second radius R2, ensures that the fine sand and dust particles remain within the scavenge plenum 232. Generally, as the air exchanges in and out of the scavenge plenum 232, the air maintains a high tangential velocity in the scavenge plenum 232 and the higher radius of the second section 264 provides a region for the particles to orbit at higher and higher radius (centrifuging) away from the plenum outlet defined by the outlet slot 248. Stated another way, the second section 264 keeps the separated particles spinning and suspended within the scavenge plenum 232. When the fine sand and dust entrained airflow enters the scavenge plenum 232, the air and the fine sand and dust particles have tangential velocity. As the air is recirculated back into the duct 230, the fine sand and dust particles remain in the scavenge plenum 232, traveling with tangential velocity. The fine sand and dust particles have mass, which combined with the tangential velocity, give the fine sand and dust particles momentum, which imparts a centrifugal force on the fine sand and dust particles as they spin, forcing them upwards or outwards into the larger second radius R2 of the second section 264.

With reference back to FIG. 3, the second section 264 is defined downstream of the outlet slot 248 (and the clusters 244), and is coupled or connected to the second plenum endwall 252. The bottom plenum surface 256 is defined along the outer perimeter or circumference of the curved portion 238 of the duct 230 from the first plenum endwall 250 to the second plenum endwall 252. In one example, the bottom plenum surface 256 is defined on the common wall 231 that also defines the outer perimeter or circumference of the curved portion 238, as discussed. The clusters 244 of the inlet passages 246 and the outlet slot 248 are each defined through the bottom plenum surface 256 and the outer perimeter or circumference of the duct 230, or the common wall 231, to fluidly couple the scavenge plenum 232 to the duct 230. The bottom plenum surface 256 follows the curvature of the curved portion 238. The clusters 244 of the inlet passages 246 are defined through the bottom plenum surface 256 and the outer perimeter or circumference of the curved portion 238 proximate the first plenum endwall 250, and the outlet slot 248 is generally defined downstream of the clusters 244 so as to be between the clusters 244 and the second plenum endwall 252. Generally, the outlet slot 248 is defined through the bottom plenum surface 256 and the outer perimeter or circumference of the curved portion 238, or the common wall 231, so as to be upstream from the second section 264 and the deswirl section 234. The first section 260 of the top plenum wall 254 cooperates with the bottom plenum surface 256 to define a first section of the scavenge plenum 232, which is defined by the first radius R1 (FIG. 2); and the second section 264 of the top plenum wall 254 cooperates with the bottom plenum surface 256 to define a second section of the scavenge plenum 232, which is defined by the second radius R2 (FIG. 2). Thus, the outlet slot 248 is defined within the first section of the scavenge plenum 232 that has the first radius R1, and is upstream from the second section of the scavenge plenum 232 that has the second radius R2.

The deswirl section 234 is in fluid communication with the combustor 132. Generally, the deswirl section 234 contains vanes, baffles, or the like, to reduce any tangential component of the airflow remaining from the action of the impeller 204. In this example, the deswirl section 234 includes a plurality of vanes 270. The deswirl section 234 is downstream of the outlet slot 248 and is downstream of the diffuser outlet 222 of the diffuser 206. The deswirl section 234 receives the air from the diffuser outlet 222 of the diffuser 206, and the air with a reduced plurality of entrained fine sand and dust particles from the outlet slot 248 of the scavenge plenum 232. After the pressurized air exits the deswirl section 274, the air enters the combustor section 116 to be received within the combustor 132 (FIG. 1). The deswirl section 234 may be integrally formed with the duct 230, if desired.

In one example, with reference to FIG. 2, with the impeller 204 formed with the impeller blades 218, the impeller hub 214 is coupled to the shaft, such as the HP shaft discussed with regard to FIG. 1. The impeller shroud 216 is coupled to the gas turbine engine 100 so as to be opposite the impeller hub 214 and spaced apart from the impeller blades 218. The diffuser 206 is formed such that the diffuser blades 228 are coupled between the hub 224 and the shroud 226. In one example, the duct 230 is integrally formed with the diffuser 206, and the clusters 244 of the inlet passages 246 may be defined through the duct 230 via drilling. The outlet slot 248 may be formed via machining or during additive manufacturing. The scavenge plenum 232 is coupled to or integrally formed with the duct 230 and is in fluid communication with the clusters 244 of the inlet passages 246 and the outlet slot 248. The diffuser 206 is coupled to the gas turbine engine 100 such that the impeller 204 is circumscribed by the diffuser 206 and the vaneless gap 208 is defined between the diffuser 206 and the impeller 204.

Figure 6:
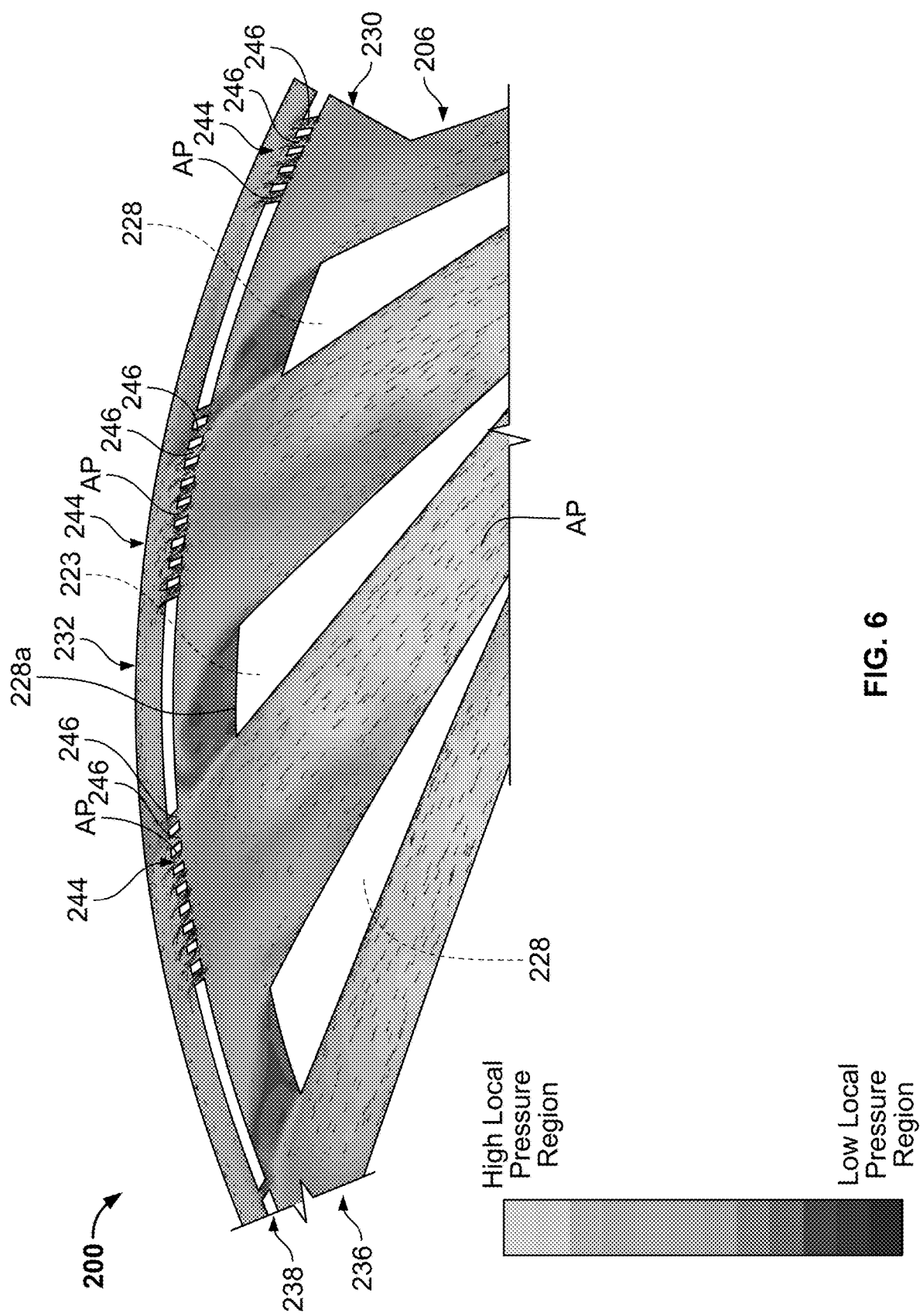
FIG. 6 is a front perspective schematic view of the portion of the compressor particle separator, which illustrates fluid, such as air, with the plurality of entrained particles, flowing into the scavenge plenum.

During operation of the gas turbine engine 100, the compressed air from the one or more axial compressors 102 (FIG. 1) flows into the impeller inlet 210. The compressed air may include a plurality of entrained particles or a plurality of entrained fine sand and dust particles. The impeller blades 218 of the impeller 204, which may be driven by the HP turbine stage 136 (FIG. 1), imparts kinetic energy into the compressed air. The air exits the impeller outlet 212 and flows into the diffuser 206 at the diffuser inlet 220. The air flows through the diffuser 206 and exits the diffuser 206 at the diffuser outlet 222. With reference to FIG. 6, the air with the plurality of entrained particles AP flows into the radial portion 236 of the duct 230 and into the curved portion 238 of the duct 230. Due to the high pressure of the air with the plurality of entrained particles AP at the first end 238a of the curved portion 238, the air with the plurality of entrained particles AP impinges on the curved portion 238 of the duct 230 at the low velocity region 240 and the local high pressure region 241. The air with the plurality of entrained particles AP enters into the clusters 244 of the inlet passages 246 at the low velocity region 240 and flows into the scavenge plenum 232.

Figure 2A:
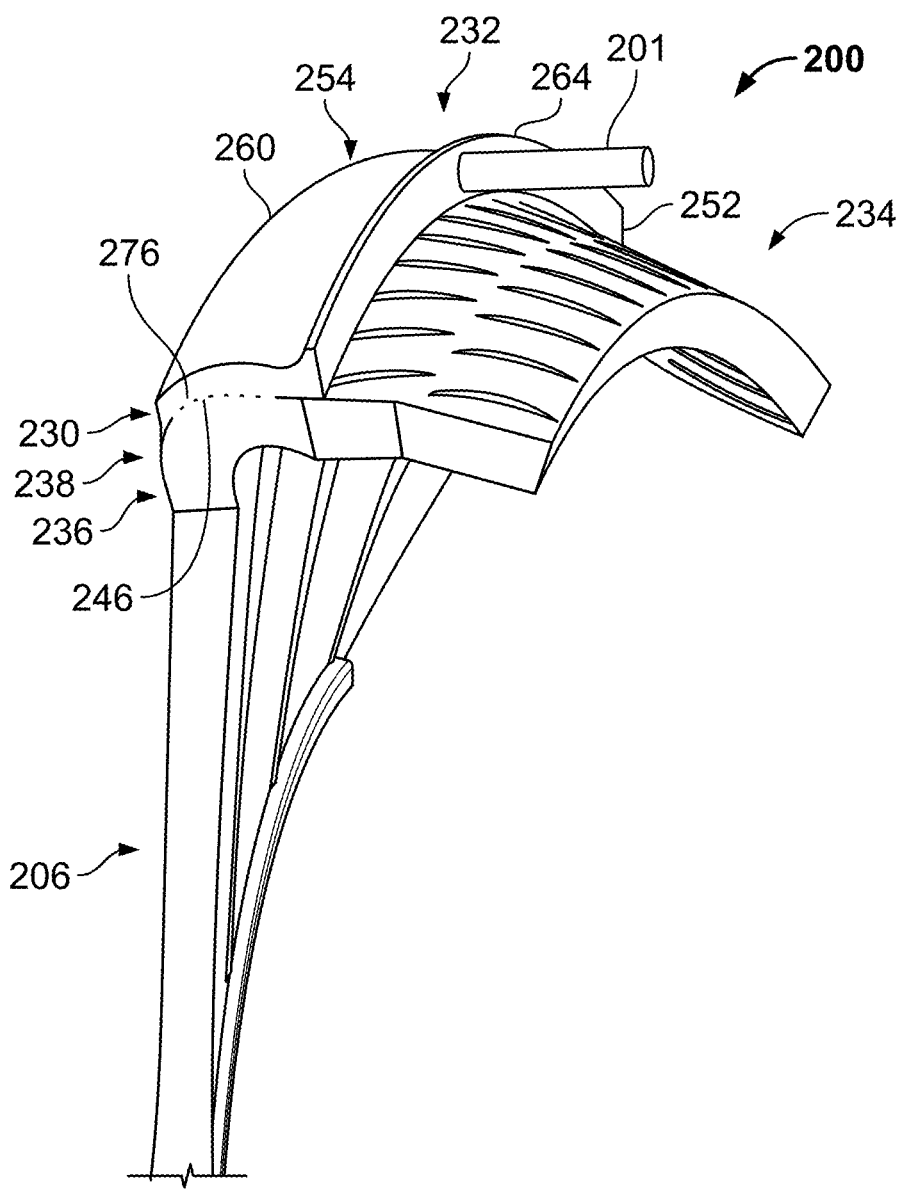
FIG. 2A is a schematic cross-sectional view of the compressor particle separator of FIG. 2, which is rotated to show an exit valve coupled to the compressor particle separator.
Figure 2B:
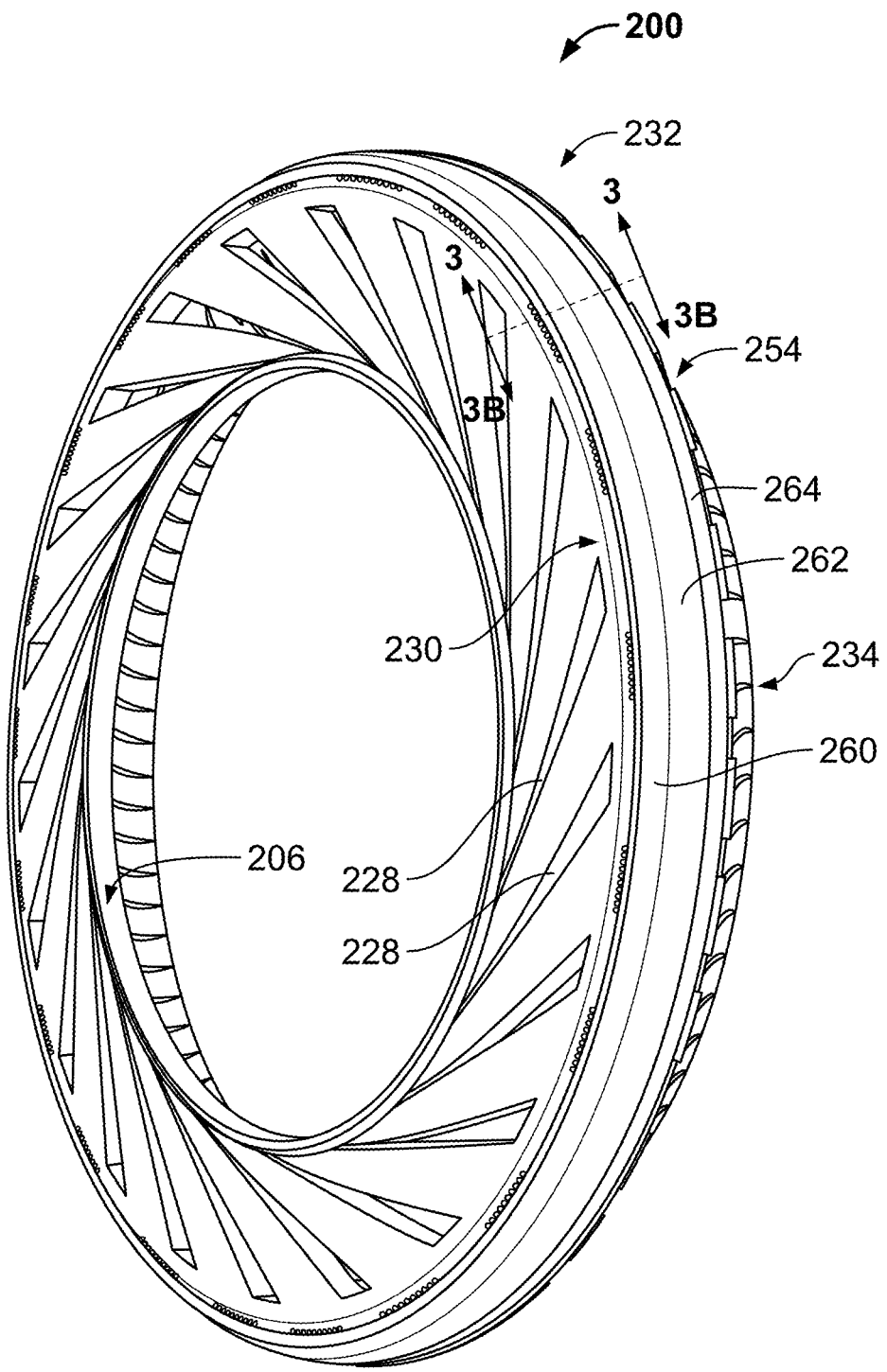
FIG. 2B is a forward perspective view of the compressor particle separator coupled downstream of a diffuser of the radial compressor and upstream from the deswirl section.

With reference to FIG. 7, the air with the plurality of entrained particles AP enters into the scavenge plenum 232 with the tangential velocity. It should be noted that due to the angle of the inlet passages 246, not all of the inlet passages 246 are illustrated in FIG. 7. Due to the particle mass of the plurality of entrained particles, the air with the plurality of entrained particles AP flows along the top plenum wall 254. The air with the plurality of entrained particles AP reaches the second section 264 with the larger second radius R2, and flows circumferentially away from the clusters 244 of the inlet passages 246. The air with the plurality of entrained particles AP has a larger inertia due to the particle mass of the entrained particles, such that the air with the plurality of entrained particles AP is unable to turn into the outlet slot 248. Air with a reduced plurality of entrained fine sand and dust particles or air with the reduced plurality of entrained particles AP' is able to turn into the outlet slot 248 and exits the scavenge plenum 232 at the high velocity region 242 and the local low pressure region 243. Thus, the air from the diffuser 206 circulates through the scavenge plenum 232, and the air flows continuously through the scavenge plenum 232 during operation of the gas turbine engine 100, which assists in removing the plurality of entrained particles from the air. The air with the reduced plurality of entrained particles AP' flows downstream to the deswirl section 234. The plurality of particles contained within the scavenge plenum 232 may be purged once the gas turbine engine 100 is shut down via the exit valve 201 (FIG. 2A).

Thus, the compressor particle separator 200 reduces a plurality of entrained particles or reduces the amount of fine sand and dust particles that flow downstream to the combustor 132 from the compressor section 114 (FIG. 1). By providing the deswirl section 234 with the air with the reduced plurality of entrained particles AP', fewer fine sand and dust particles pass into the combustor 132 and into the turbines 134 of the turbine section 118 (FIG. 1). The reduction in the plurality of entrained particles improves performance of the gas turbine engine 100, and reduces an accumulation of the fine sand and dust particles in cooling circuits or cooling holes associated with components of the gas turbine engine 100 (FIG. 1). By placing the outlet slot 248 at the high velocity region 242 and the local low pressure region 243 upstream from the second plenum endwall 252, the outlet slot 248 ensures a continuous removal of entrained fine sand and dust particles during the operation of the gas turbine engine 100 (FIG. 1), which ensures that the downstream components (the combustor 132 and the turbines 134) receive the air with the reduced plurality of entrained particles. Thus, the compressor particle separator 200 improves the life of the gas turbine engine 100 (FIG. 1), and the length of time the gas turbine engine 100 (FIG. 1) may remain in operation improves. In addition, the compressor particle separator 200 decreases an amount of maintenance needed for the gas turbine engine 100 (FIG. 1).

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A particle separator associated with a compressor section of a gas turbine engine, comprising:
    a duct that defines a fluid flow path from a diffuser to a deswirl section, the duct including a curved portion between an outlet of the diffuser and an inlet of the deswirl section, the curved portion configured to have at least one low velocity region and a high velocity region;
    at least one cluster of inlet passages defined through the curved portion of the duct at the at least one low velocity region and configured to receive a fluid that includes a plurality of entrained particles from the outlet of the diffuser;
    a scavenge plenum coupled to the duct and in fluid communication with the at least one cluster of inlet passages, the scavenge plenum configured to receive the fluid that includes the plurality of entrained particles from the at least one cluster of inlet passages and to separate the plurality of entrained particles from the fluid to provide at least one outlet slot with the fluid with a reduced plurality of entrained particles; and the at least one outlet slot defined through the duct downstream of the at least one cluster of inlet passages in the high velocity region and in fluid communication with the scavenge plenum, the at least one outlet slot configured to receive the fluid with the reduced plurality of entrained particles and configured to cooperate with the at least one cluster of inlet passages to enable the fluid to flow continuously through the scavenge plenum during operation of the gas turbine engine.

2. The particle separator of claim 1, wherein the scavenge plenum has a first section with a first radius, and a second section with a second radius, the second radius different than the first radius, and the second section is configured to inhibit the plurality of entrained particles from flowing through the at least one outlet slot.

3. The particle separator of claim 2, wherein the second radius is greater than the first radius.

4. The particle separator of claim 2, wherein the second section is downstream of the at least one outlet slot.

5. The particle separator of claim 2, wherein the scavenge plenum includes a first plenum endwall opposite a second plenum endwall and a top plenum wall that connects the first plenum endwall to the second plenum endwall, and the at least one outlet slot is defined through the duct upstream from the second plenum endwall.

6. The particle separator of claim 1, wherein the at least one outlet slot is a continuous slot.

7. The particle separator of claim 1, wherein the scavenge plenum is coupled to the duct so as to be radially outboard of the curved portion.

8. The particle separator of claim 1, wherein the at least one cluster of inlet passages comprises a first cluster of inlet passages and a second cluster of inlet passages, the first cluster of inlet passages spaced apart from the second cluster of inlet passages about a circumference the curved portion of the duct.

9. The particle separator of claim 1, wherein the at least one cluster of inlet passages is defined downstream of an adjacent pair of diffuser blades associated with the diffuser.

10. The particle separator of claim 1, wherein the curved portion has a first end proximate the diffuser and a second end proximate the deswirl section, with the at least one low velocity region defined at the first end and the high velocity region defined proximate the second end upstream from the deswirl section.

11. A compressor section of a gas turbine engine, comprising:

a diffuser configured to receive a fluid that includes a plurality of entrained particles, and a diffuser outlet;

a duct that defines a fluid flow path from the diffuser to a deswirl section, the duct including a curved portion between the diffuser outlet of the diffuser and an inlet of the deswirl section, the curved portion configured to have at least one low velocity region upstream from a high velocity region;

a plurality of clusters of inlet passages defined through the curved portion of the duct at the at least one low velocity region and configured to receive the fluid that includes the plurality of entrained particles, each of the plurality of clusters of inlet passages spaced apart from each other about a circumference of the curved portion of the duct;

a scavenge plenum coupled to the duct and in fluid communication with the plurality of clusters of inlet passages, the scavenge plenum configured to receive the fluid that includes the plurality of entrained particles from the plurality of clusters of inlet passages and to separate the plurality of entrained particles from the fluid to provide at least one outlet slot with the fluid with a reduced plurality of entrained particles;

the at least one outlet slot defined through the duct downstream of the plurality of clusters of inlet passages and in fluid communication with the scavenge plenum, the at least one outlet slot configured to receive the fluid with the reduced plurality of entrained particles and configured to cooperate with the plurality of clusters of inlet passages to enable the fluid to flow continuously through the scavenge plenum during operation of the gas turbine engine; and the deswirl section downstream from the at least one outlet slot configured to receive the fluid with the reduced plurality of entrained particles.

12. The compressor section of claim 11, wherein the scavenge plenum has a first section with a first radius, and a second section with a second radius, the second radius different than the first radius, and the second section is configured to inhibit the plurality of entrained particles from flowing through the at least one outlet slot.

13. The compressor section of claim 12, wherein the second radius is greater than the first radius and the second section is downstream of the at least one outlet slot.

14. The compressor section of claim 12, wherein the scavenge plenum includes a first plenum endwall opposite a second plenum endwall and a top plenum wall that connects the first plenum endwall to the second plenum endwall, and the at least one outlet slot is defined through the duct upstream from the second plenum endwall.

15. The compressor section of claim 11, wherein the scavenge plenum is coupled to the duct so as to be radially outboard of the curved portion.

16. The compressor section of claim 11, wherein the curved portion has a first end proximate the diffuser and a second end proximate the deswirl section, with the at least one low velocity region defined at the first end and the high velocity region defined proximate the second end and upstream from the deswirl section.

17. The compressor section of claim 11, wherein the at least one outlet slot is a continuous slot.

18. A compressor section of a gas turbine engine, comprising:

a diffuser configured to receive a fluid that includes a plurality of entrained particles, and a diffuser outlet;

a duct that defines a fluid flow path from the diffuser to a deswirl section, the duct including a curved portion between the diffuser outlet of the diffuser and an inlet of the deswirl section, the curved portion configured to have at least one low velocity region upstream from a high velocity region;

a plurality of clusters of inlet passages defined through the curved portion of the duct at the at least one low velocity region and configured to receive the fluid that includes the plurality of entrained particles, each of the plurality of clusters of inlet passages spaced apart from each other about a circumference of the curved portion of the duct;

a scavenge plenum coupled to the duct and in fluid communication with the plurality of clusters of inlet passages, the scavenge plenum configured to receive the fluid that includes the plurality of entrained particles from the plurality of clusters of inlet passages and to separate the plurality of entrained particles from the fluid to provide at least one outlet slot with the fluid with a reduced plurality of entrained particles, and the scavenge plenum includes a first plenum endwall opposite a second plenum endwall and a top plenum wall that connects the first plenum endwall to the second plenum endwall;

an outlet slot defined through the duct downstream of the plurality of clusters of inlet passages and in fluid communication with the scavenge plenum, the outlet slot defined through the duct upstream from the second plenum endwall, the outlet slot configured to receive the fluid with the reduced plurality of entrained particles and configured to cooperate with the plurality of clusters of inlet passages to enable the fluid to flow continuously through the scavenge plenum during operation of the gas turbine engine; and the deswirl section downstream from the outlet slot configured to receive the fluid with the reduced plurality of entrained particles.

19. The compressor section of claim 18, wherein the scavenge plenum has a first section with a first radius, and a second section with a second radius, the second radius different than the first radius, and the second section is configured to inhibit the plurality of entrained particles from flowing through the outlet slot.

20. The compressor section of claim 19, wherein the second radius is greater than the first radius and the second section is downstream of the outlet slot.

* * * * *